R. SCHMITZ.
CLUTCH.
APPLICATION FILED FEB. 7, 1919.

1,351,135.

Patented Aug. 31, 1920.
3 SHEETS—SHEET 1.

Inventor:
Richard Schmitz
by Dodson & Roe
Attys

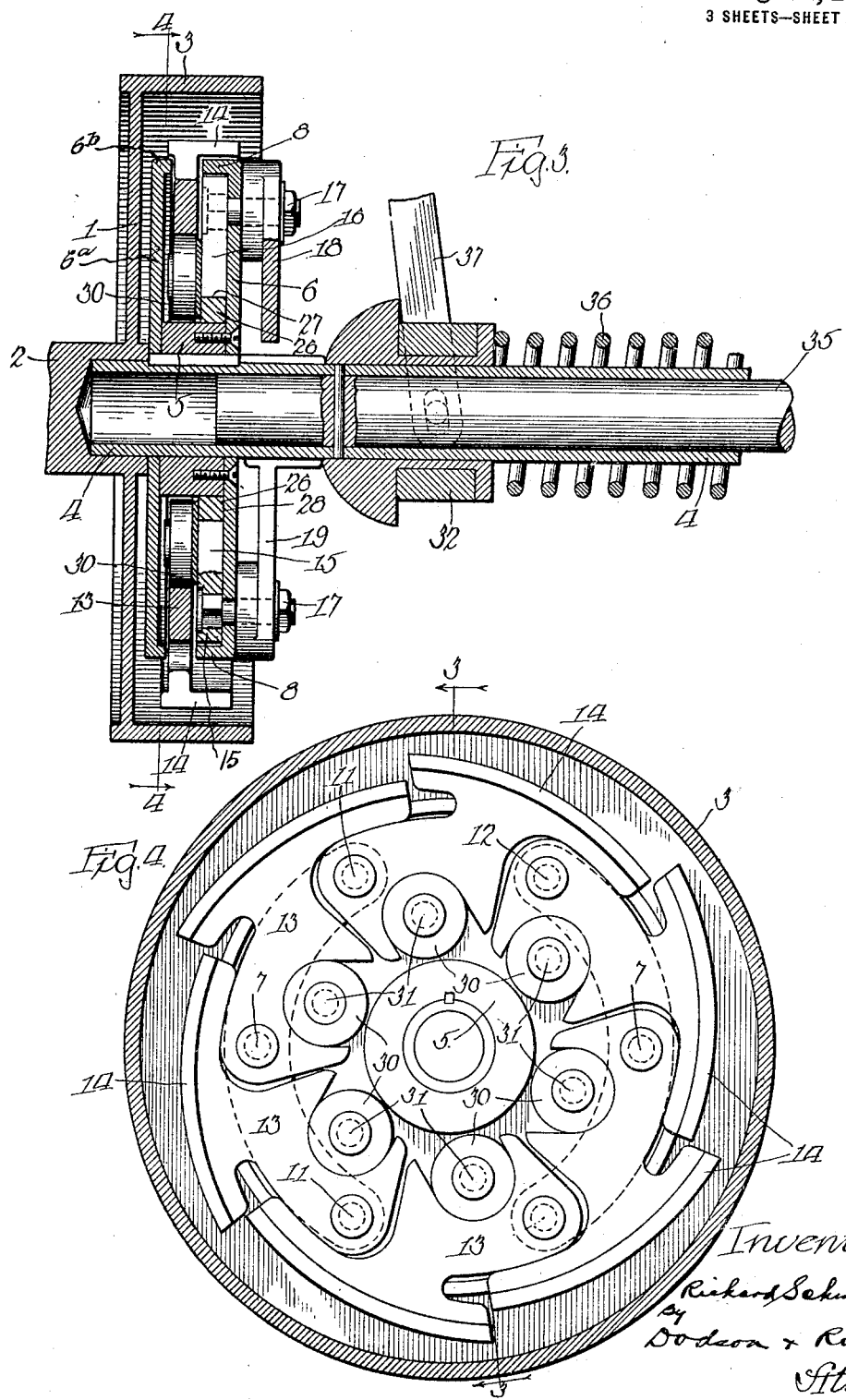

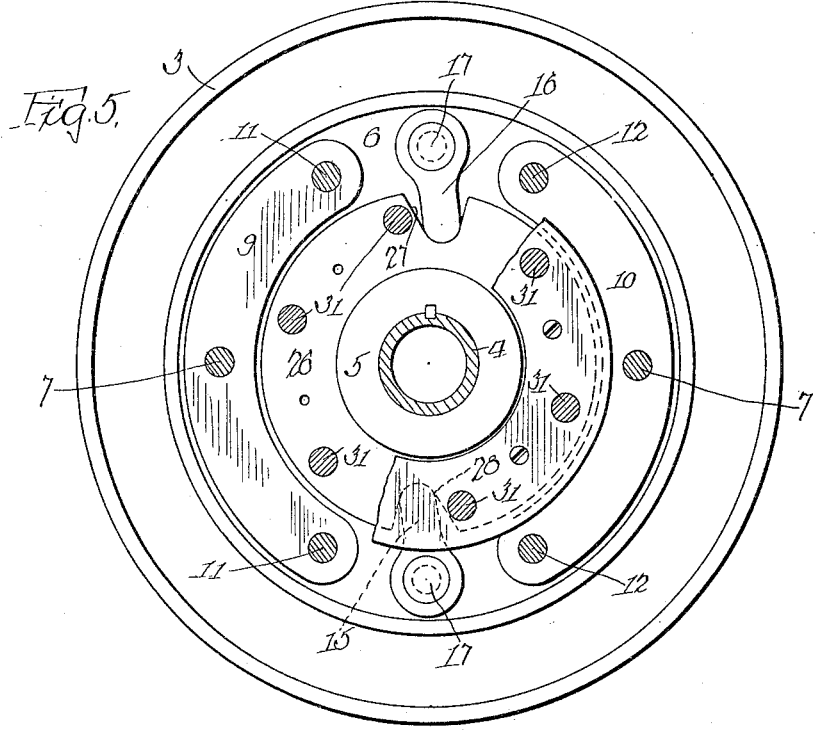
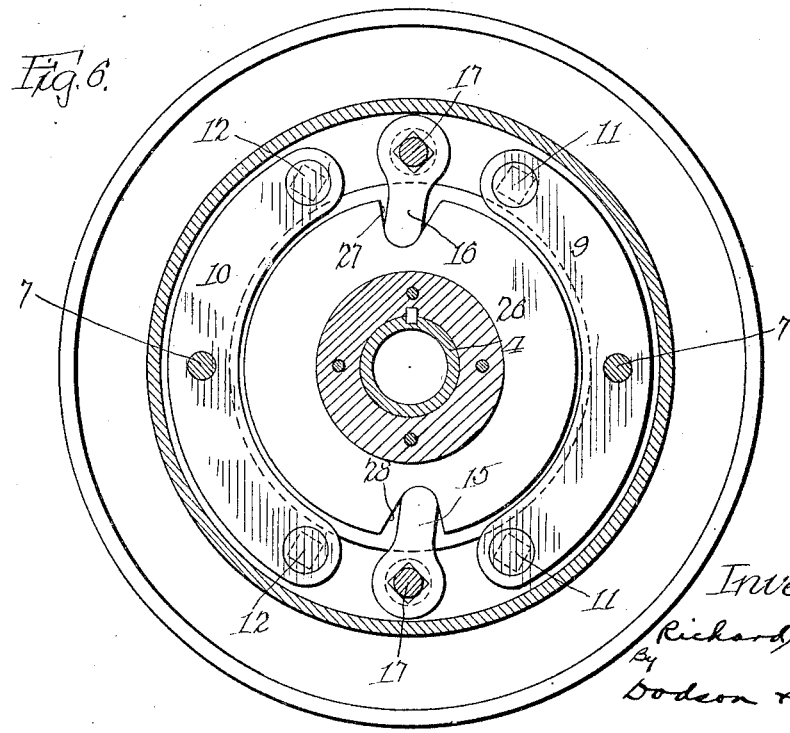

UNITED STATES PATENT OFFICE.

RICHARD SCHMITZ, OF CHICAGO, ILLINOIS.

CLUTCH.

1,351,135.  Specification of Letters Patent.  Patented Aug. 31, 1920.

Application filed February 7, 1919. Serial No. 275,493.

*To all whom it may concern:*

Be it known that I, RICHARD SCHMITZ, a citizen of the United States, residing at Chicago, in the county of Cook and State of Illinois, have invented a certain new and useful Improvement in Clutches, of which the following is the specification.

My invention relates to that class of devices which are employed to effect operative union between a moving and non-moving mechanism, and has for its object to provide a device which will more effectually grasp the mechanism to be gripped and which can be constructed so as to be practically inclosed and thereby not only protect the operating mechanism from dust and dirt, but also permit the packing of these parts with a heavy lubricant such as graphite and grease, which it will retain for an indefinite period of time.

My means of accomplishing the foregoing objects may be more readily understood by having reference to the accompanying drawings which are hereunto annexed and are a part of this specification, in which:

Fig. 3 is a vertical sectional view.

Fig. 4 is a cross section taken on the line 4—4 in Fig. 3.

Figs. 5 and 6 are detail views of the interior mechanism.

Similar reference numerals refer to similar parts throughout the entire description.

Figure 1:
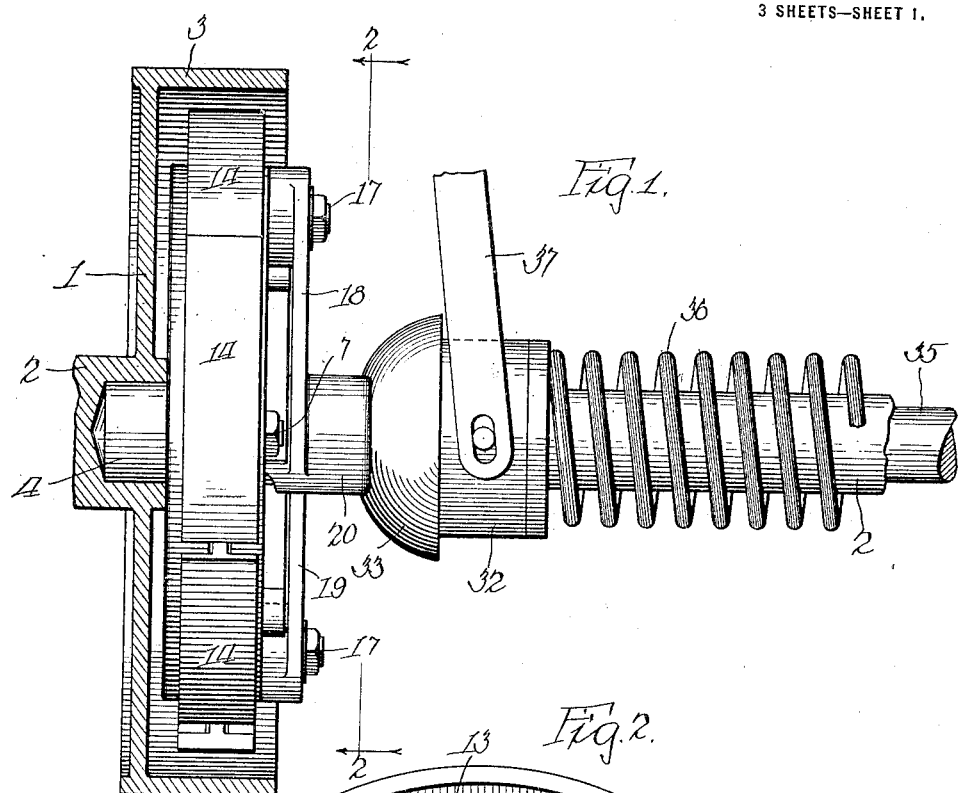
Figure 1 is a side view partly in section of my improvement.
Figure 2:
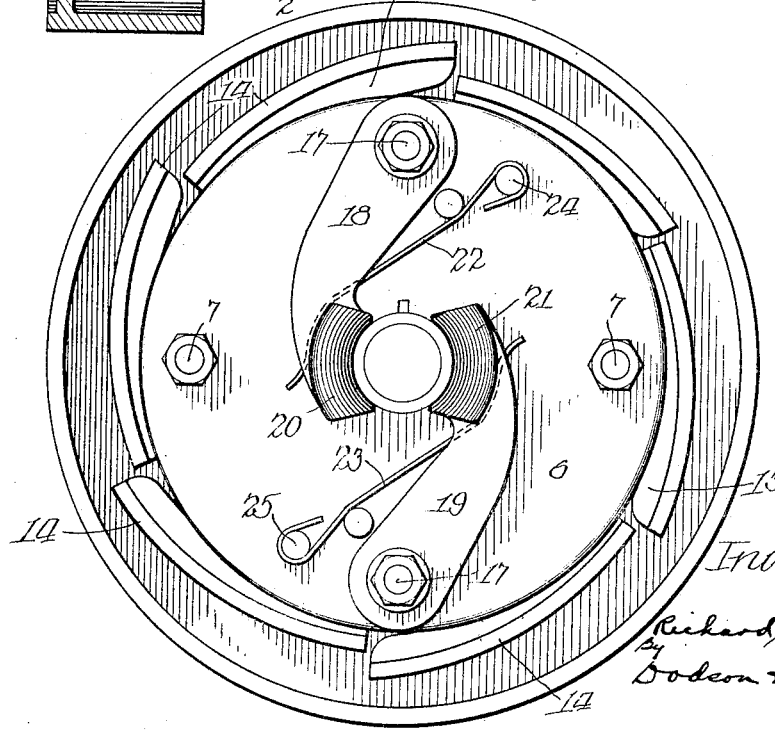
Fig. 2 is a cross section taken on the line 2—2 in Fig. 1.

As shown in the drawings, 1 indicates the fly wheel, which is provided with a hub 2 and a peripheral flange 3. Fixedly mounted upon the tube 4 is a hub 5 which is provided with an outwardly extending flange 6 in which are mounted a plurality of stud bolts 7. The flange 6 is also provided with a laterally extending peripheral flange 8. In order to inclose the mechanism for operating the frictional devices, a plate 6ª is applied to the hub 5 and this last mentioned plate has an inwardly extending flange 6ᵇ. The plate 6 with its flange and the plate 6ª with its flange form a housing like structure in which the operating mechanism of the frictional devices is inclosed and protected from access of foreign substances and it may also retain a lubricant. Upon the stud bolts 7 are pivotally mounted, segments 9 and 10 which are provided with stud bolts 11 and 12 adjacent the ends thereof.

Upon these stud bolts are mounted frictional devices 13 which are provided with frictional engaging surfaces 14 which are adapted to contact with the inner surface of the flange 3 on the fly wheel 1. Mounted upon the flange 6 and at points diametrically opposite to each other, are inwardly extending lugs 15 and 16, which are fixedly secured to bolts 17. These bolts carry arms 18 and 19, which are provided with laterally extending members 20 and 21, the inner surface of which is beveled. Springs 22 and 23 are mounted upon pins 24 and 25 in the flange 6 and serve to hold the arms 18 and 19 normally pressed against the tube 4. An annular plate 26 is rotatably mounted upon the hub 5 and has recesses 27 and 28 cut therein which are adapted to receive the inwardly projecting lugs 15 and 16. This annular member carries a plurality of rollers 30, which are mounted upon pins or pivots 31, carried by the annular member 26, and which are fitted to the U-shaped recesses formed in the frictional devices 13.

A collar 32 is splined upon the tube 4 and is provided with a beveled shoulder 33 which is adapted to engage the laterally extending members 20 and 21 on the arms 18 and 19. A coil spring 36 is provided to hold the shoulder 33 normally in engagement with said members. A transmission shaft 35 is mounted inside of the tube 4 thus making a convenient form of connection between the mechanism to be rotated and the clutch mechanism. A shifting lever 37, the lower end of which is forked and adapted to engage the collar 32 so as to shift the same longitudinally upon the tube 4, is arranged as shown in Fig. 1.

The operation of the device is as follows:

The shifting of the lever 37 moves the collar 32 inwardly on the shaft. This effects the engagement of the beveled shoulder 33 with the beveled laterally projecting members 20 and 21 and moves them outwardly. The outward movement of these arms, through the medium of the lugs 15 and 16, serves to rotate the annular member 26 carrying with it the rollers 30. This causes the rollers to engage the side of the U-shaped recesses in the frictional devices, thus swinging them upon the stud bolts 7, 11 and 12, moving them outwardly and bringing the frictional surfaces into gripping engagement with the inner surface of the flange 3 on the fly wheel 1, thus effecting a uniform gripping action on the part of the frictional devices and transmitting the rotation of the fly wheel 1 to the transmission shaft 35.

It will be obvious that moving the shifting lever in the opposite direction will withdraw the beveled shoulder 33 from contact with the beveled portion of the laterally extending members 20 and 21 on the arms 18 and 19, when the springs 22 and 23 will move these arms inwardly to their normal position against the shaft, and this movement will, through the lugs 15 and 16, rotate the annular plate 26 in the opposite direction and thus through the rollers contacting with the surface of the U-shaped recesses in the frictional devices, retract them, bringing them completely out of engagement with the flange 3 on the fly wheel 1, thereby permitting it to run free without any motion being transmitted to the transmission shaft 35.

Having described my invention, what I regard as new and desire to secure by Letters Patent is:

1. In a device of the character described, the combination with a member to be gripped, of a clutch mechanism comprising a tube, a hub fixedly mounted thereon having a radially extending flange, stud bolts mounted in said flange, a segment pivotally secured to each of said stud bolts, stud bolts mounted in said segments, frictional devices pivotally carried by all said stud bolts having frictional engaging surfaces formed thereon, there being U-shaped recesses in said frictional devices adjacent the bearing for said stud bolts, an annular member mounted on said hub, a plurality of rollers in number corresponding to the number of frictional devices, said rollers being fitted to the U-shaped recesses, notches cut in said annular member, inwardly extending lugs which engage said notches, pins rotatably mounted in said flange to which said lugs are affixed, arms mounted upon the opposite end of said pins having laterally extending beveled portions on their inner end, springs mounted upon said flange which hold said arms normally against the tube, and means mounted upon said tube adapted to move said arms outwardly whereby the annular member is rotated and the frictional devices are projected outwardly for the purpose set forth substantially as described.

2. In a device of the character described, the combination with a member to be gripped, of a clutch mechanism comprising a tube, a hub fixedly mounted thereon having a radially extending flange, stud bolts mounted in said flange, a segment pivotally secured to each of said stud bolts, stud bolts mounted in said segments, frictional devices pivotally carried by all of said stud bolts having frictional engaging surfaces formed thereon, there being U-shaped recesses in said frictional devices adjacent the bearing for said stud bolts, an annular member mounted on said hub, a plurality of rollers in number corresponding to the number of frictional devices, said rollers being fitted to the U-shaped recesses, longitudinally movable means mounted on said tube the movement of which operates to rotate said annular member whereby the frictional devices are projected outwardly.

3. In a device of the character described, the combination with a member to be gripped, of a clutch mechanism comprising a tube, a hub fixedly mounted thereon having a radially extending flange, stud bolts mounted in said flange, a segment pivotally secured to each of said stud bolts, stud bolts mounted in said segments, frictional devices pivotally carried by all of said stud bolts having frictional engaging surfaces formed thereon, there being U-shaped recesses in said frictional devices adjacent the bearing for said stud bolts, an annular member mounted on said hub, a plurality of rollers in number corresponding to the number of frictional devices, said rollers coinciding with and fitted to the U-shaped recesses, longitudinally movable means mounted on said tube the movement of which operates to rotate said annular member whereby the frictional devices are projected outwardly, and spring actuated means to return them to their normal position when said longitudinally movable means is shifted back to its normal position.

4. In a device of the character described, the combination with a member to be gripped, of a clutch mechanism comprising a tube, a hub fixedly mounted thereon having a radially extending flange, a laterally extending peripheral flange thereon, stud bolts mounted in said flange, a segment pivotally secured to each of said stud bolts, stud bolts mounted in said segments, frictional devices carried by all said stud bolts having frictional engaging surfaces formed thereon, there being U-shaped recesses in said frictional devices adjacent the bearing for said stud bolts, an annular member mounted on said hub, a plurality of rollers in number corresponding to the number of frictional devices, said rollers being fitted to the U-shaped recesses, notches cut in said annular member, inwardly extending lugs which engage said notches, pins rotatably mounted in said flange to which said lugs are affixed, arms mounted upon the opposite end of said pins having laterally extending beveled portions on their inner end, springs mounted upon said flange which hold said arms normally against the tube, and a plate secured to the end of said hub having a laterally extending flange thereon.

5. In a device of the character described, the combination with a member to be gripped, of a clutch mechanism comprising a tube, a hub fixedly mounted thereon having a radially extending flange, stud bolts mounted in said flange, a segment pivotally secured to each of said stud bolts, stud bolts mounted in said segments, frictional devices pivotally carried by said stud bolts having frictional engaging surfaces formed thereon, there being U-shaped recesses in said frictional devices adjacent the bearing for said stud bolts, an annular member mounted on said hub, a plurality of rollers in number corresponding to the number of frictional devices, said rollers being fitted to the U-shaped recesses, notches cut in said annular member, inwardly extending lugs which engage said notches, pins rotatably mounted in said flange to which said lugs are affixed, arms mounted upon the opposite end of said pins, means to move said arms away from the center and springs to hold them normally toward the center.

6. In a device of the character described, the combination with a member to be gripped, of a clutch mechanism comprising a tube, a hub fixedly mounted thereon having a radially extending flange, stud bolts mounted in said flange, a segment pivotally secured to each of said stud bolts, stud bolts mounted in said segments, frictional devices pivotally carried by all of said stud bolts having frictional engaging surfaces formed thereon, there being U-shaped recesses in said frictional devices adjacent the bearing for said stud bolts, an annular member mounted on said hub, a plurality of rollers in number corresponding to the number of frictional devices, said rollers being fitted to the U-shaped recesses, longitudinally movable means mounted on said tube the movement of which operates to rotate said annular member whereby the frictional devices are projected outwardly, and a spring to hold said longitudinally movable means in the position which holds said frictional devices projected outwardly.

In testimony whereof I have signed the foregoing specification.

RICHARD SCHMITZ.